(12) United States Patent
Jung et al.

(10) Patent No.: US 10,963,989 B2
(45) Date of Patent: Mar. 30, 2021

(54) APPARATUS AND METHOD OF GENERATING STITCHED IMAGE BASED ON LOOK-UP TABLE

(71) Applicant: Electronics and Telecommunications Research Institute, Daejeon (KR)

(72) Inventors: Soon Heung Jung, Daejeon (KR); Yong Ju Cho, Daejeon (KR); Jeong Il Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 94 days.

(21) Appl. No.: 16/155,660

(22) Filed: Oct. 9, 2018

(65) Prior Publication Data

US 2019/0318453 A1 Oct. 17, 2019

(30) Foreign Application Priority Data

Apr. 11, 2018 (KR) .................. 10-2018-0042000

(51) Int. Cl.
*G06K 9/00* (2006.01)
*G06T 3/40* (2006.01)
*G06T 3/00* (2006.01)
*G06T 7/33* (2017.01)

(52) U.S. Cl.
CPC .......... *G06T 3/4038* (2013.01); *G06T 3/0081* (2013.01); *G06T 3/0093* (2013.01); *G06T 7/337* (2017.01)

(58) Field of Classification Search
CPC combination set(s) only.
See application file for complete search history.

(56) References Cited

U.S. PATENT DOCUMENTS

| 6,369,831 | B1* | 4/2002 | Baba ................ G03H 1/268 345/635 |
| 8,204,133 | B2 | 6/2012 | Cho et al. |
| 9,363,449 | B1 | 6/2016 | Jiang et al. |
| 2016/0047889 | A1* | 2/2016 | Takahashi ............ G01S 5/16 250/203.6 |
| 2016/0286138 | A1 | 9/2016 | Kim |
| 2016/0360195 | A1* | 12/2016 | Itoh .................. G06T 7/80 |

FOREIGN PATENT DOCUMENTS

| KR | 100724134 B1 | 6/2007 |
| KR | 1020140028516 A | 3/2014 |
| KR | 1020160094655 A | 8/2016 |
| KR | 1020160118868 A | 10/2016 |
| KR | 101704362 B1 | 2/2017 |
| KR | 1020180022539 A | 3/2018 |

OTHER PUBLICATIONS

Huang, A 360-degree Panoramic Video System Design, 2014, IEEE (Year: 2014).*

* cited by examiner

*Primary Examiner* — Alex Kok S Liew
(74) *Attorney, Agent, or Firm* — William Park & Associates Ltd.

(57) ABSTRACT

Disclosed is an apparatus and method of generating a stitched image. A method of generating a stitched image according to the present disclosure includes: obtaining a plurality of input images; determining whether or not a parallax problem occurs between overlapping areas of the obtained input images; updating a predetermined look-up table according to the determination; and generating a stitched image by applying the updated look-up table to the input images.

14 Claims, 11 Drawing Sheets

[FIG. 1]

[FIG. 2]
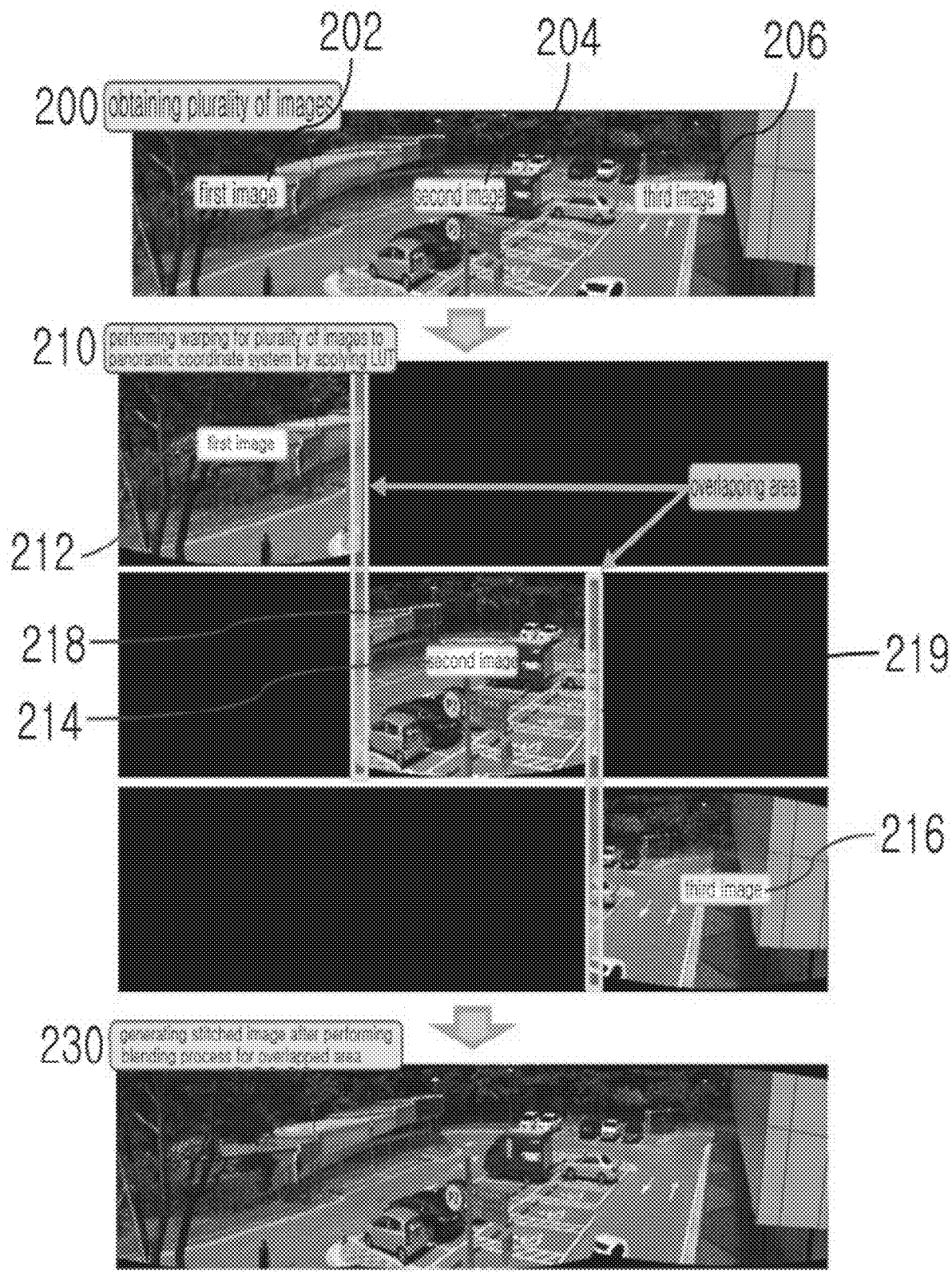

[FIG. 3]

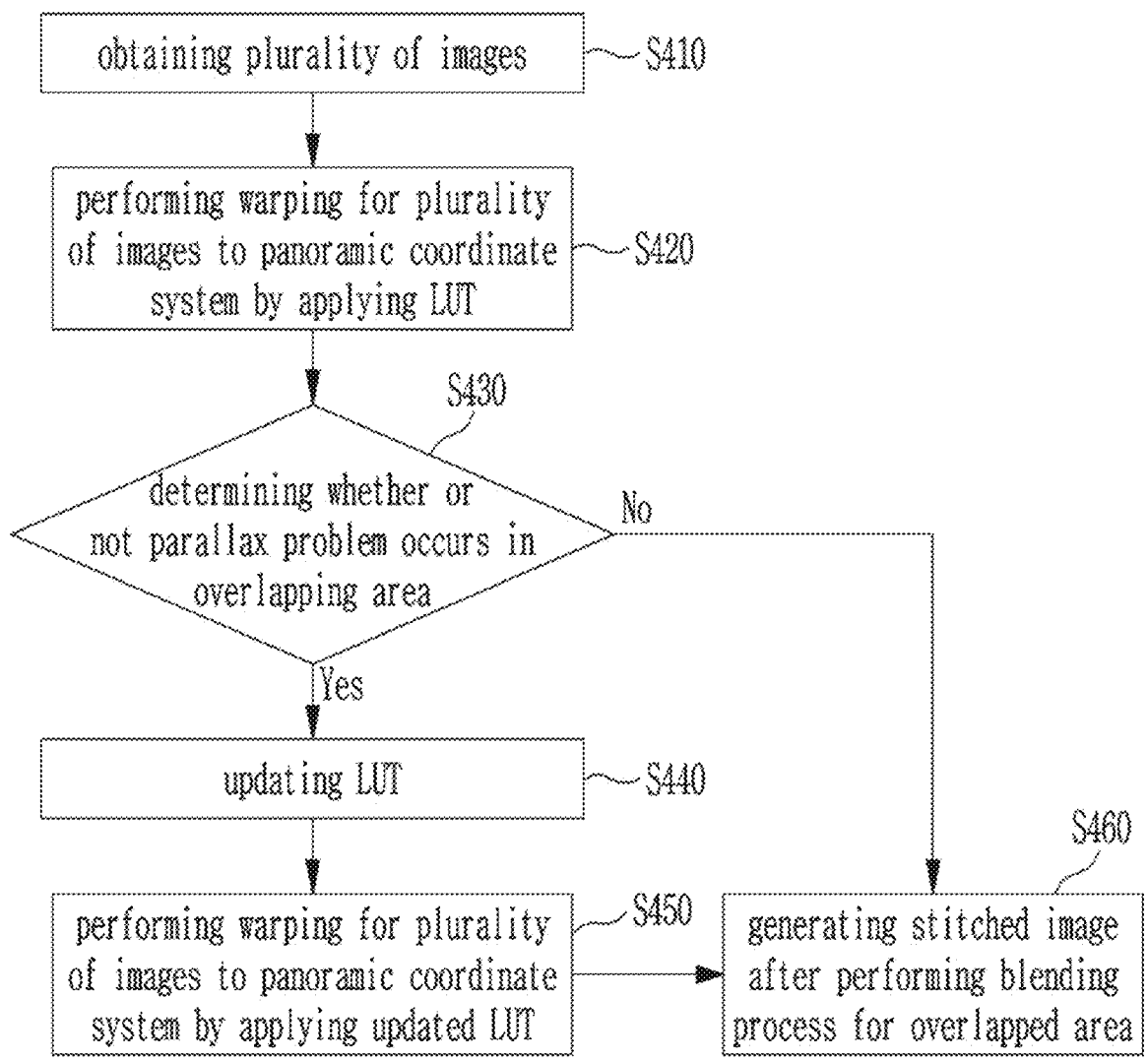
[FIG. 4]

[FIG. 5]
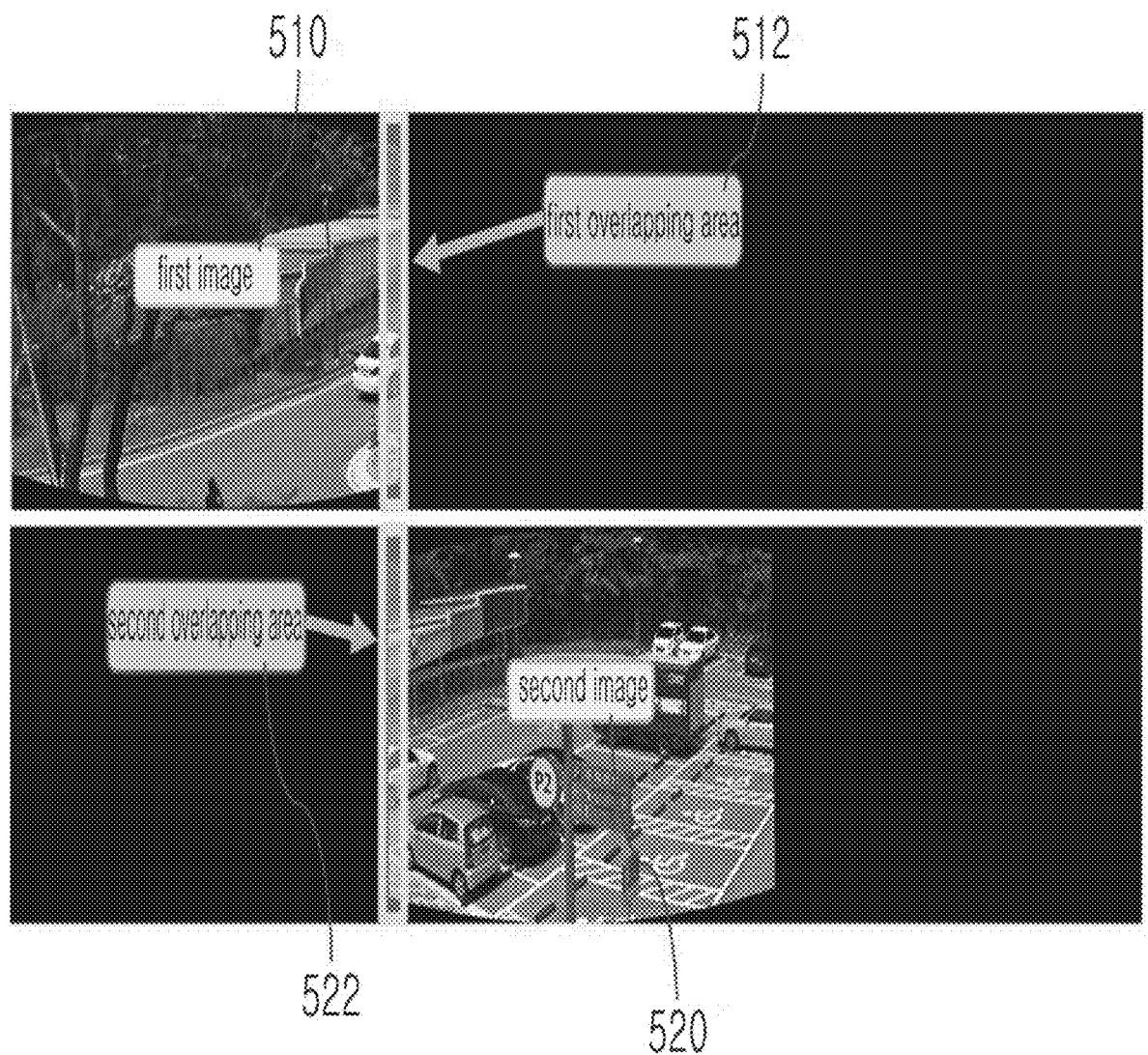

[FIG. 6A]
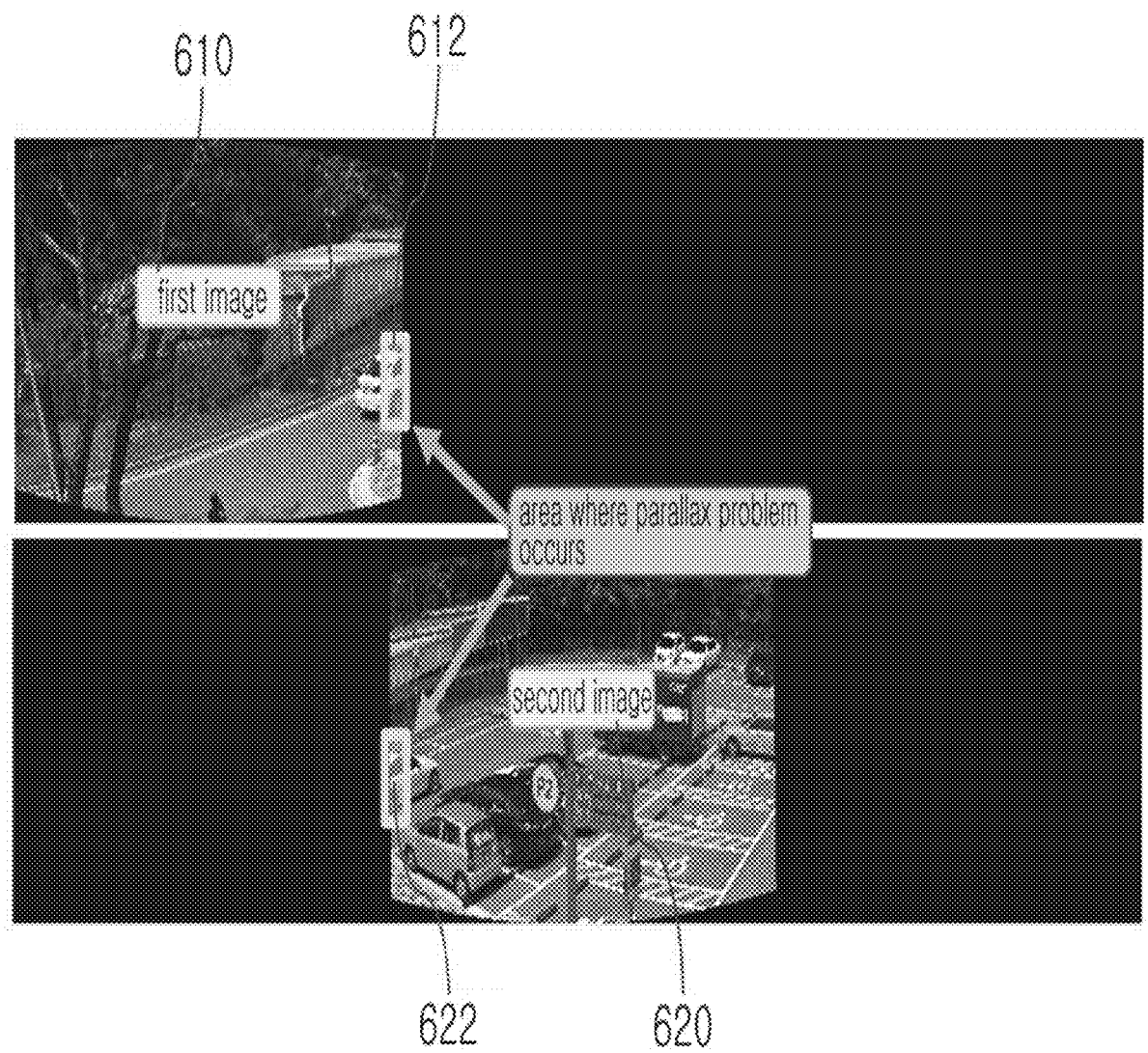

[FIG. 6B]
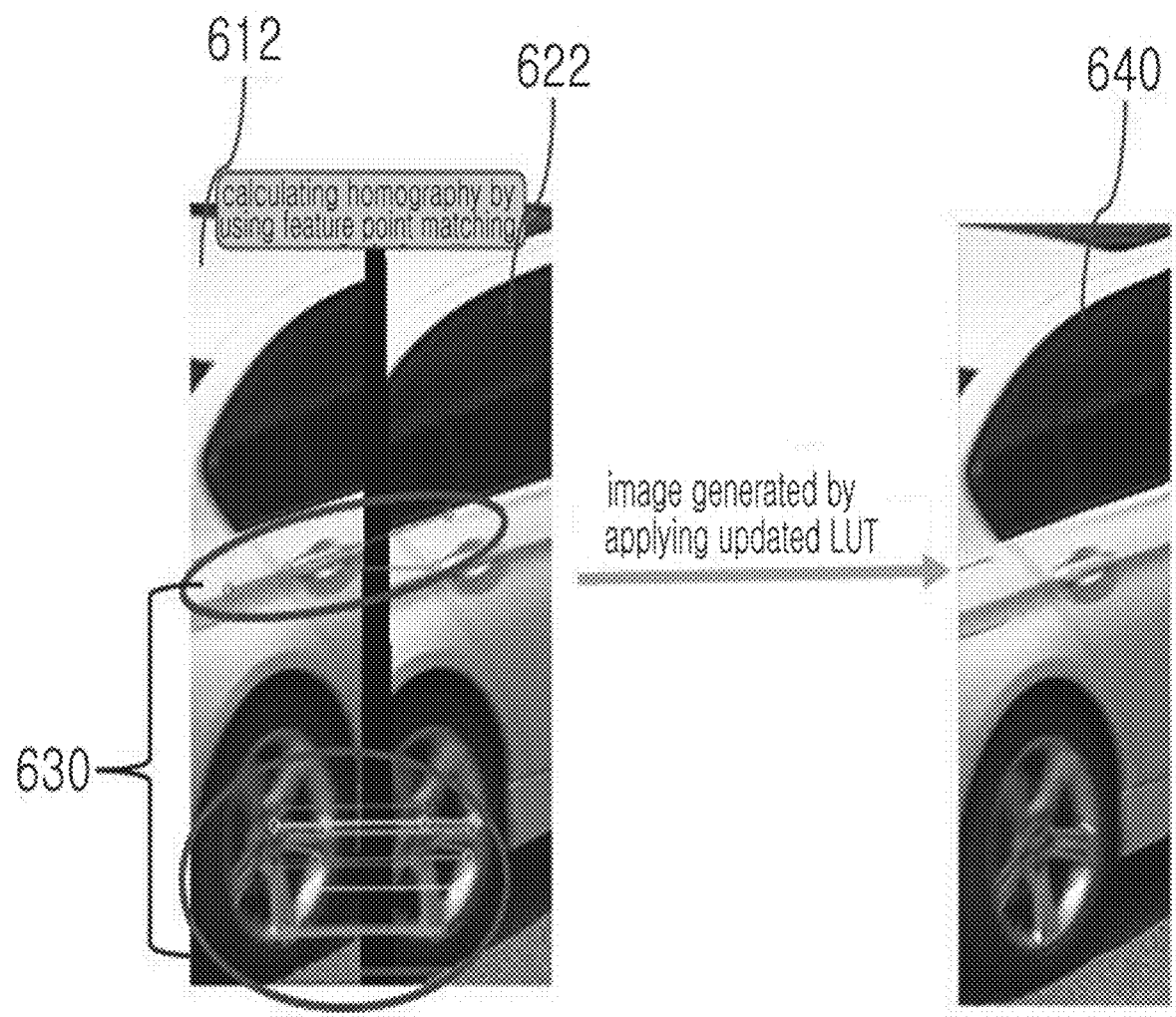

[FIG. 7]
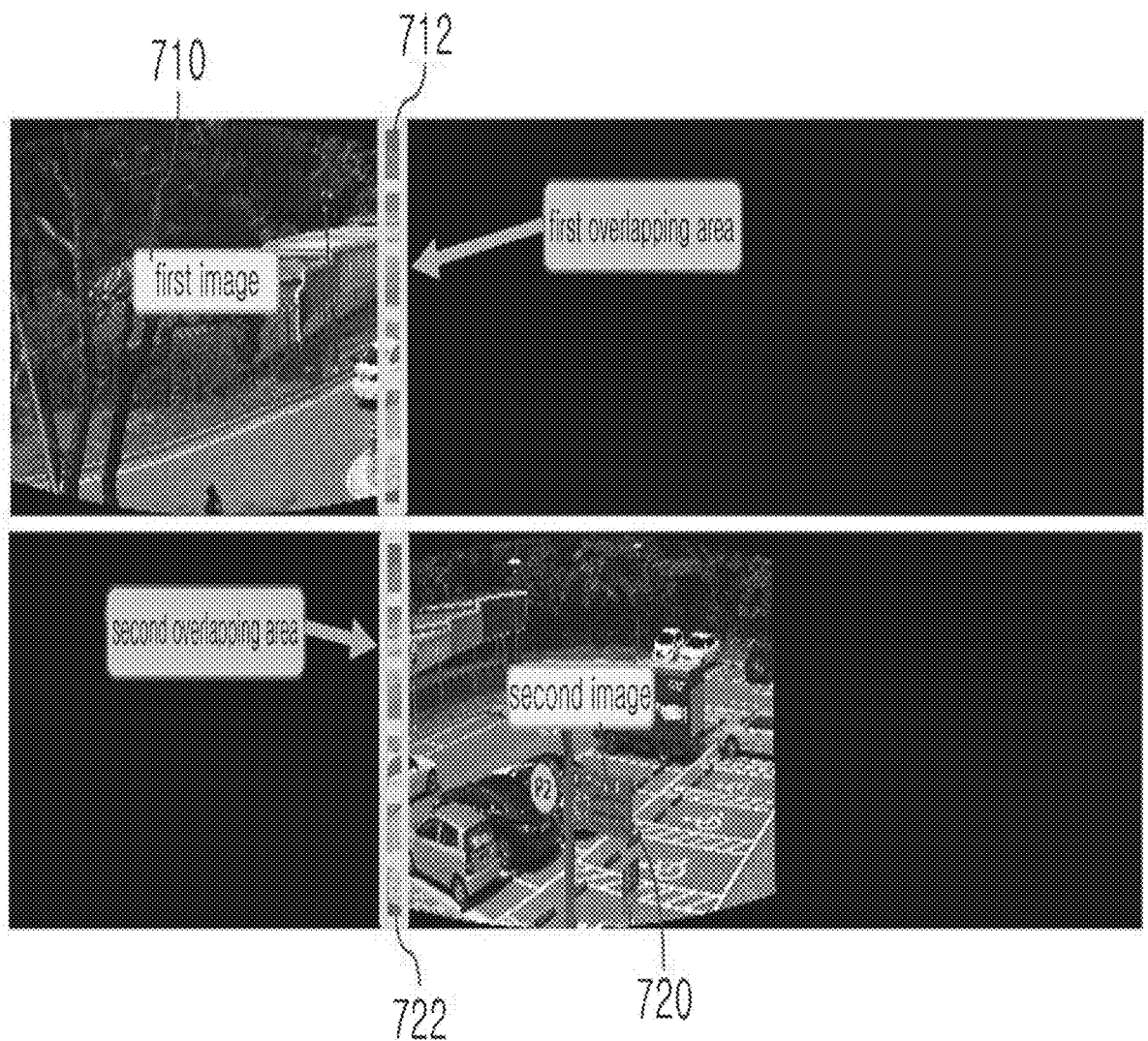

[FIG. 8]
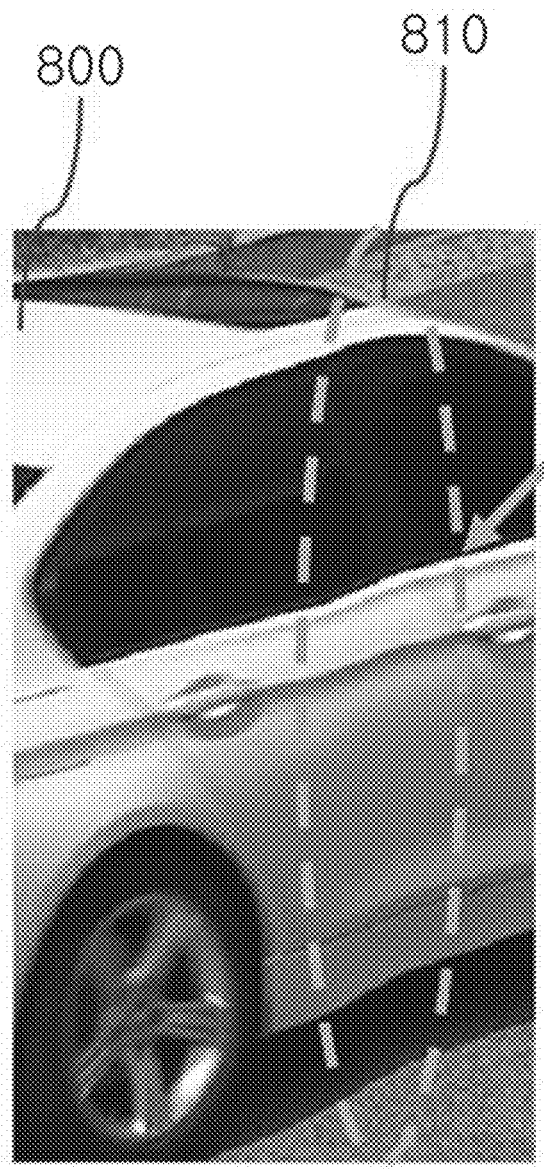

[FIG. 9]
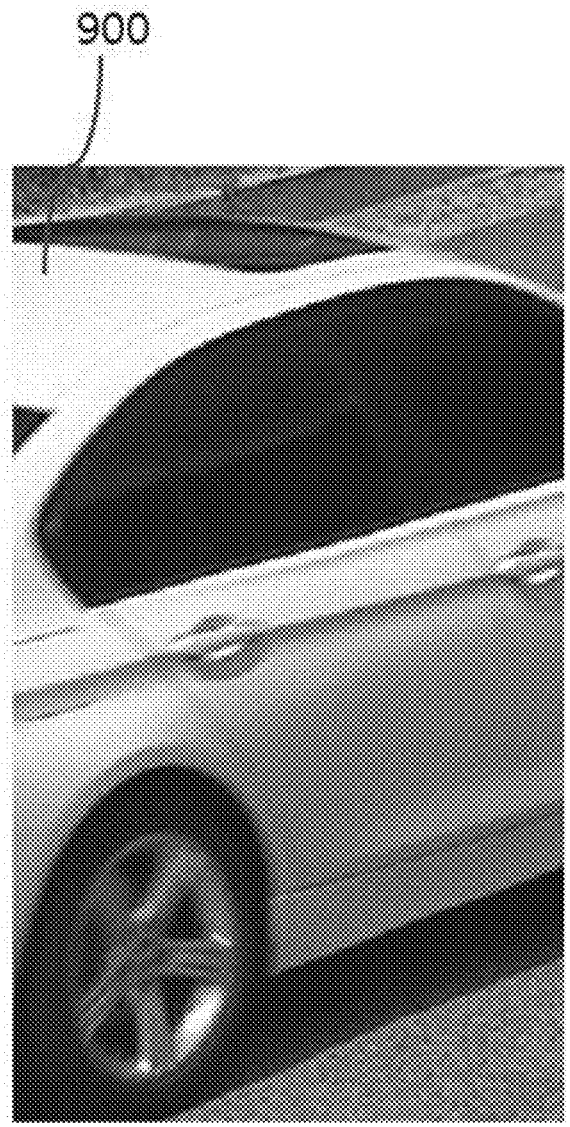

[FIG. 10]
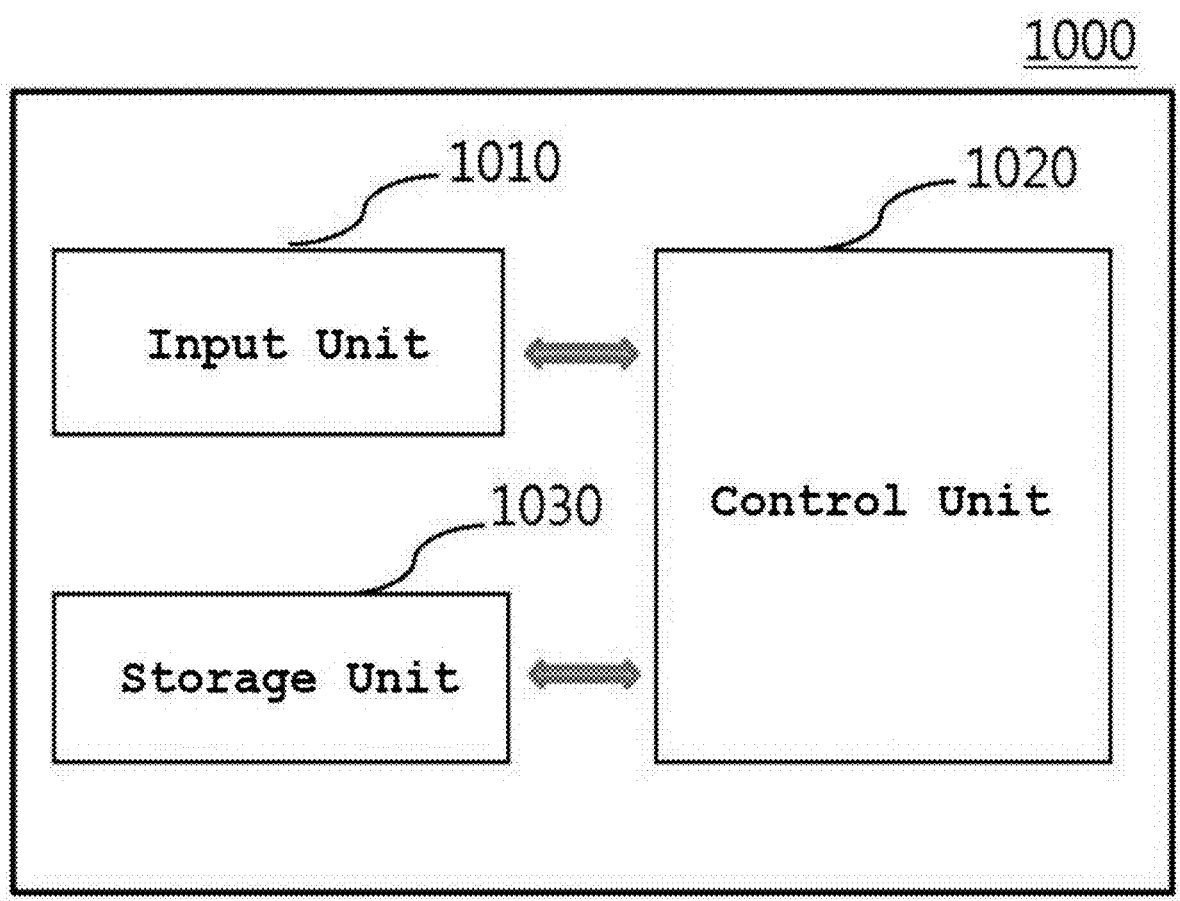

APPARATUS AND METHOD OF GENERATING STITCHED IMAGE BASED ON LOOK-UP TABLE

CROSS REFERENCE TO RELATED APPLICATION

The present application claims priority to Korean Patent Application No. 10-2018-0042000, filed Apr. 11, 2018, the entire contents of which is incorporated herein for all purposes by this reference.

BACKGROUND OF THE INVENTION

Field of the Invention

The present disclosure relates generally to an apparatus and method of generating a stitched image on the basis of a look-up table. More particularly, the present disclosure relates to an apparatus and method of generating a stitched image, the apparatus and method being capable of minimizing a parallax problem by updating a look-up table of an overlapping area.

Description of the Related Art

In order to obtain a seamless image by stitching a plurality of videos, geometrical correction of an image is essentially required. Image geometrical correction includes image processing methods such as homography transformation, interpolation, etc., and a large amount of calculation is required when performing each step of correction for each frame. FIG. 1 is a view showing an example of obtaining a plurality of videos by using a plurality of cameras. Referring to FIG. 1, a panoramic video or 360-degree image may be obtained by simultaneously obtaining a plurality of videos by using a plurality of cameras. When stitching is performed by using a plurality of videos, generating a stitched video in real time is difficult since large amount of image processing is required. Accordingly, a method is provided where geometrical correction information is used in a look-up table (LUT) manner so that large amount of image processing is available. For example, in an environment where movement of a camera is small, or capturing an image in a long distance is performed, calculation complexity for generating a real time stitched video may be reduced by using the same look-up table.

Meanwhile, in order to generate a panoramic or 360-degree image, a plurality of cameras is used. However, points of origin of cameras are physically different, thus a parallax problem occurs in an overlapping area. A look-up table is generated in consideration of such a problem. However, when a stitched video is generated by using the same look-up table, a parallax problem still occurs.

SUMMARY OF THE INVENTION

An object of the present disclosure is to provide an apparatus and method of generating a stitched image on the basis of a look-up table.

Another object of the present disclosure is to provide an apparatus and method of generating a stitched image whereby a parallax problem in an overlapping area is minimized by updating a look-up table.

Technical problems obtainable from the present disclosure are not limited by the above-mentioned technical problems, and other unmentioned technical problems may be clearly understood from the following description by those having ordinary skill in the technical field to which the present disclosure pertains.

In order to achieve the above object, according to one aspect of the present invention, there is provided a method of generating a stitched image, the method comprising: obtaining a plurality of input images; determining whether or not a parallax problem occurs between overlapping areas of the obtained input images; updating a predetermined look-up table according to the determination; and generating a stitched image by applying the updated look-up table to the input images.

According to another aspect of the present disclosure, there is provided an apparatus for generating a stitched image, the apparatus comprising: an input unit for obtaining a plurality of input images; a control unit; and a storage unit storing a predetermined look-up table, wherein the control unit determines whether or not a parallax problem occurs between overlapping areas of the obtained input images, updates the look-up table according to the determination, and generates a stitched image by applying the updated look-up table to the input images.

It is to be understood that the foregoing summarized features are exemplary aspects of the following detailed description of the present invention without limiting the scope of the present invention.

According to the present disclosure, there is provided an apparatus and method of generating a stitched image on the basis of a look-up table.

In addition, according to the present disclosure, there is provided an apparatus and method of generating a stitched image whereby a parallax problem in an overlapping area is minimized by updating a look-up table.

The effects obtainable from the present disclosure are not limited to the effects mentioned above, and it will be clearly appreciated that other effects not mentioned can be clearly understood by those skilled in the art from the description below.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a view showing an example of obtaining a video by using a plurality of cameras according to an embodiment;

FIG. 2 is a view showing obtaining a panoramic image by using a plurality of videos according to an embodiment of the present disclosure;

FIG. 3 is a view showing parallax occurring when performing video stitching using the same look-up table according to an embodiment of the present disclosure;

FIG. 4 is a view showing a stitched image generating apparatus based on a look-up table according to an embodiment of the present disclosure;

FIG. 5 is a view showing operation of determining whether or not a parallax problem has occurred between overlapping areas according to an embodiment of the present disclosure;

FIGS. 6A and 6B are views showing updating a look-up table when a parallax problem has occurred between overlapping areas according to an embodiment of the present disclosure;

FIG. 7 is a view showing updating a look-up table when a parallax problem has occurred between overlapping areas according to another embodiment of the present disclosure;

FIG. 8 is a view showing distortion occurring between areas to be updated of a look-up table according to an embodiment of the present disclosure;

FIG. 9 is a view showing an example of removing distortion between areas according to whether or not updating of a look-up table is performed by using a control point; and FIG. 10 is a view showing a configuration of a stitched image generating apparatus based on a look-up table according to an embodiment of the present disclosure.

DETAILED DESCRIPTION OF THE INVENTION

Hereinbelow, exemplary embodiments of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure. Further, parts not related to description of the present disclosure are not shown in the drawings and like reference numerals are given to like components.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Hereinbelow, exemplary embodiments of the present disclosure will be described in detail with reference to the accompanying drawings. Throughout the drawings, the same reference numerals will refer to the same or like parts.

FIG. 2 is a view showing obtaining a panoramic image by using a plurality of videos according to an embodiment of the present disclosure.

According to the present disclosure, a process of obtaining a panoramic image will be described, but it is not limited thereto. The present disclosure may be applied to a process of performing stitching using an LUT for a panoramic image, a 360-degree image, etc. An apparatus for generating a stitched image of the present disclosure may obtain a plurality of images. Referring to FIG. 2, an apparatus for generating a stitched image of the present disclosure may obtain, in 200, a first image 202, a second image 204, and a third image 206 which overlap with each other at a partial area thereof. A plurality of images may include a still image or a video, and the images may be overlapped with each other at a partial area thereof for generating a panoramic or 360-degree image. The stitched image generating apparatus may perform warping for the obtained images to a panoramic coordinate system by applying a predetermined look-up table (LUT). Referring to FIG. 2, the stitched image generating apparatus of the present disclosure may obtain, in 210, a first transform image 212, a second transform image 214, and a third transform image 216 which are obtained by performing warping for the obtained first image 202, the second image 204, and the third image 206 to a panoramic coordinate system by respectively applying a predetermined look-up table. In order to generate a stitched image, stitching has to be performed for respective neighbor images, and thus overlapping areas may occur between neighbor images. Referring to FIG. 2, a first overlapping area 218 is an overlapping area occurring when performing stitching between the first transform image 212 and the second transform image 214, and a second overlapping area 219 is an overlapping area occurring when performing stitching between the second transform image 214 and the third transform image 216. The stitched image generating apparatus may generate a stitched image by using the transform images. Referring to FIG. 2, in 230, the stitched image generating apparatus may generate a stitched image after performing blending processing for overlapping areas between transform images.

FIG. 3 is a view showing parallax occurring when performing video stitching using the same look-up table according to an embodiment of the present disclosure.

Referring to FIG. 3, in 310, the stitched image generating apparatus may obtain a stitched image 310 by using the same look-up table for a plurality of input images. Herein, when an object is present in an overlapping area, parallax occurs when performing image stitching, and thus image distortion may occur in the overlapping area. Referring to FIG. 3, image distortion has occurred in a partial area 320 including an overlapping area 330 when performing image stitching.

FIG. 4 is a view showing operation of a stitched image generating apparatus based on a look-up table according to an embodiment of the present disclosure.

In step S410, a plurality of images for generating a stitched image may be obtained. For example, the plurality of images may include a still image or a video, and the respective images may be overlapped with each other at a partial area thereof for generating a panoramic or 360-degree image.

In step S420, the plurality of images obtained in step S410 may be warped to a panoramic coordinate system by applying a predetermined look-up table to the obtained plurality of images.

In step S430, for the images warped to a panoramic coordinate system, whether or not a parallax problem occurs in an overlapping area between neighbor images may be determined.

When it is determined that a parallax problem occurs in step S430, in step S440, a look-up table may be updated. For example, updating the look-up table may mean updating a value of control points functioning as reference points to be warped to a panoramic coordinate system by applying a look-up table.

In step S450, the input images may be warped to a panoramic coordinate system by applying the updated look-up table.

In step S460, a stitched image may be generated by performing blending processing for an overlapping area of the warped input images.

Meanwhile, when it is determined that a parallax problem does not occur in step S430, in step S460, a stitched image may be generated by performing blending processing for the overlapping area without updating the look-up table.

FIG. 5 is a view showing operation of determining whether or not a parallax problem occurs between overlapping areas according to an embodiment of the present disclosure.

When a parallax problem does not occur in input images warped to a panoramic coordinate system by using a predetermined look-up table, pixels at an identical position within an overlapping area may respectively have pixel values which are almost the same. However, when a parallax problem occurs, a difference in pixel values of pixels at an identical position within the overlapping area becomes large since geometrical correction is not performed well. By using the above feature, whether or not a parallax problem occurs in an overlapping area may be determined. For example, referring to FIG. 5, a sum of squared errors (SSE) between an first overlapping area 512 of a first image 510 and a second overlapping area 522 of a second image 520 may be calculated, and the calculated value may be compared with a predetermined threshold value, and thus whether or not a parallax problem occurs between overlapping areas may be determined by performing the comparison. In addition, a SSE of the entire overlapping area may be calculated, but whether or not a parallax problem occurs may be determined by calculating a SSE of a specific area including the overlapping area or a specific part included in the overlapping area. In addition, a feature that a parallax problem occurs when a new object enters into the overlapping area may be used. For example, when change occurs in the overlapping area of the warped image, it may be determined that a parallax problem has occurred. In detail, a difference in pixel values at the same pixel position between images obtained temporally after a reference image may be used.

FIGS. 6A and 6B are views showing updating a look-up table when a parallax problem occurs between overlapping areas according to an embodiment of the present disclosure.

Referring to FIG. 6A, the stitched image generating apparatus may use a first image 610 and a second image 620 which include an overlapping area for generating a stitched image. Each of the first image 610 and the second image 620 may be an image of the same timing in an image sequence.

The first image 610 and the second image 620 may be warped to a panoramic coordinate system by using a predetermined look-up table. For image stitching, the first image 610 and the second image 620 may respectively include overlapping areas. In a first overlapping area 612 including a vehicle in the first image 610 and a second overlapping area 622 including the same vehicle in the second image 620, a parallax problem may occur. Referring to FIG. 6B, the stitched image generating apparatus may calculate a homography by using feature point matching 630, and update a look-up table of an area where a parallax problem occurs by using the calculated result. For example, the stitched image generating apparatus may update a look-up table of a second image when an area extracted from a first warped image is used as a reference. In addition, for example, the stitched image generating apparatus may update a look-up table of a first image when an area extracted from a second warped image is used as a reference. The stitched image generating apparatus may update a look-up table by adjusting a value of a control point present in a corresponding area.

In addition, the stitched image generating apparatus of the present disclosure may extract an area where a parallax problem occurs, and determine a movement distance where a difference value between pixels becomes minimum by moving the extracted area in a vertical or horizontal direction. The stitched image generating apparatus may update a look-up table by using the determined movement distance. In addition, for example, the stitched image generating apparatus may update a look-up table by using a preset value when a parallax problem occurs.

In addition, in order to reduce a parallax problem occurring between two images, the stitched image generating apparatus of the present disclosure may update a look-up table of one image, or a look-up table of both images when updating the look-up table.

FIG. 7 is a view showing updating a look-up table when a parallax problem has occurred between overlapping areas according to another embodiment of the present disclosure.

Referring to FIG. 7, the stitched image generating apparatus may use a first image 710 and a second image 720 which include an overlapping area for generating a stitched image. Each of the first image 710 and the second image 720 may be an image of the same timing in an image sequence. The first image 710 and the second image 720 may be warped to a panoramic coordinate system by using a predetermined look-up table. For image stitching, the first image 710 and the second image 720 may respectively include overlapping areas. In a first overlapping area 712 including a vehicle in the first image 710 and a second overlapping area 722 including the same vehicle in the second image 720, a parallax problem may occur. The stitched image generating apparatus of the present disclosure may divide the overlapping area into a plurality of sub-areas. In addition, the stitched image generating apparatus of the present disclosure may calculate difference values among pixels included in each sub-area by moving each sub-area. For example, the stitched image generating apparatus may move each sub-area in a horizontal or vertical direction. In addition, for example, difference values may be SSE among pixels included in each sub-area. In addition, the stitched image generating apparatus may update a look-up table by using movement information in which a difference value among pixels becomes minimum. For example, the movement information may be a movement distance in a horizontal or vertical direction. In detail, the stitched image generating apparatus may use as a reference value that is obtained by multiplying a difference value between pixels which is calculated during which an area does not move and a weight (for example, real number values between 0 to 1), and update an LUT of a corresponding area by determining whether or not parallax occurs when the difference value between pixels calculated by moving the area in a vertical or horizontal direction is less than the reference value. Updating the LUT of the corresponding area may be partially performed among a plurality of areas.

FIG. 8 is a view showing distortion occurring between areas to be updated of a look-up table according to an embodiment of the present disclosure.

The stitched image generating apparatus of the present disclosure may update a look-up table of predetermined neighbor pixels of an area where parallax occurs for natural video reproduction. Herein, distortion may occur between an area where a look-up table is updated and an area where a look-up table is not updated. Referring to FIG. 8, image distortion occurs at a boundary area 810 at which a look-up table is updated when obtaining a stitched image 800.

FIG. 9 is a view showing an example of removing distortion between areas according to whether or not updating of a look-up table is performed by using a control point.

The stitched image generating apparatus of the present disclosure may adjust a value of a control point present nearby where parallax occurs to remove distortion between areas according to whether or not updating of a look-up table is performed. For example, the control point may mean a reference point for performing warping of an input image to a panoramic coordinate system by applying a look-up table. According to an embodiment, a formula for adjusting values of neighbor control points may be represented as Formula 1 below.

$$(X',Y')=(X,Y)+W^n(Mx,My)$$ [Formula 1]

In Formula 1, X and Y respectively represent vertical and horizontal positional values of a control point present nearby where parallax occurs, W represents a value between 0 to 1, n represents a distance to an area where parallax occurs, and Mx and My respectively represent an average value where control points are horizontally changed and an average value where control points are vertically changed in the area where parallax occurs. Referring to FIG. 9, by applying control point values present nearby an area where parallax occurs to the adjusted look-up table, an image 900 without distortion where a parallax problem has been naturally solved may be obtained.

FIG. 10 is a view showing a configuration of a stitched image generating apparatus based on a look-up table according to an embodiment of the present disclosure.

Referring to FIG. 10, a stitched image generating apparatus 1000 may include at least one of an input unit 1010, control unit 1020, and a storage unit 1030. However, FIG. 10 shows only some of the components necessary for describing the present embodiment, and components included in the stitched image generating apparatus 1000 are not limited in the above example. For example, at least two components may be implemented in one component, or operations executed in one component may be divided and executed in at least two components. In addition, some of the components may be omitted, or an additional component may be added.

The input unit 1010 may receive image sequences, text, audio (for example, voice, music, etc.), additional information (for example, EPG, etc.), etc. from outside of the stitched image generating apparatus 1000 under a control of the control unit 1020.

For example, the input unit 1010 may obtain a plurality of images by using a plurality of image obtaining devices (for example, camera). The plurality of images may include a still image or a video, and each of the images may be overlapped for generating a panoramic or 360-degree image.

The control unit 1020 controls overall operation of the stitched image generating apparatus 1000, controls a signal flow between internal components within the stitched image generating apparatus 1000, and performs data processing. The control unit 1020 may use data stored in the storage unit 1030 and execute various applications when a user input is received or a condition that is preset and stored is satisfied.

For example, the control unit 1020 may determine whether or not a parallax problem occurs between overlapping areas of input images, update a look-up table according to the determination, and generate a stitched image by applying the updated look-up table to the input images.

In addition, for example, in order to determine whether or not a parallax problem occurs between overlapping areas, the control unit 1020 may calculate a SSE of each overlapping area of the input images, and compare the calculated SSE with a predetermined threshold value.

In addition, for example, the control unit 1020 may calculate a homography by using feature point matching when a parallax problem occurs, and update a look-up table of the overlapping area where a parallax problem occurs by using the calculated result. Meanwhile, the control unit 1020 may not update a look-up table of the overlapping area when a parallax problem does not occur.

In addition, for example, the control unit 1020 may perform warping for the input image to a predetermined coordinate system by applying the updated look-up table, and generate a stitched image by stitching respective overlapping areas of the input images that is warped to a predetermined coordinate system.

In addition, for example, the control unit 1020 may update a look-up table on the basis of a position of a control point present adjacent to the overlapping area that is determined that a parallax problem has occurred. In detail, as the Formula 1, values of control points may be adjusted by using coordinates of control points present nearby where parallax occurs, a distance to an area where parallax occurs, average movement values of coordinates of corresponding control points, etc.

In addition, for example, when it is determined that a parallax problem has occurred, the control unit 102 may divide the overlapping area into a plurality of sub-areas, and update of a look-up table of an overlapping area that is determined that a parallax problem has occurred on the basis of a difference value between pixels included in the sub-area.

The storage unit 1030 may store various types of data, programs, or applications for controlling the stitched image generating apparatus 1000 under a control of the control unit 1020.

For example, the storage unit 1030 may store data of a predetermined look-up table for transforming an input image to a predetermined coordinate system. For example, the predetermined coordinate system may include a coordinate system for generating a panoramic image or a coordinate system for generating a 360-degree image.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various embodiments of the present disclosure are not presented to describe all of available combinations but are presented to describe only representative combinations. Steps or elements in various embodiments may be separately used or may be used in combination.

In addition, various embodiments of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various embodiments to be executed in an apparatus or on a computer, and a non-transitory computer-readable medium storing such software or machine-executable instructions so that the software or instructions can be executed in an apparatus or on a computer.

What is claimed is:

1. A method of generating a stitched image used for panoramic images or 360-degree images, the method comprising:
    obtaining a plurality of input images;
    determining whether or not a parallax problem occurs between overlapping areas of the obtained input images;
    updating a predetermined look-up table according to the determination by adjusting a value of a control point on at least one overlapping adjacent region; and
    generating a stitched image by applying the updated look-up table to the input images,
    wherein the overlapping areas is a region where the plurality of input images overlapped, and the overlapping adjacent region is adjacent to the overlapping areas.

2. The method of claim 1, wherein the determining of whether or not the parallax problem occurs includes:
    calculating a sum of squared errors (SSE) of each of the overlapping areas of the input images; and
    comparing the calculated SSE with a predetermined threshold value.

3. The method of claim 1, wherein in the updating of the look-up table, the value of the control point that is used as a reference point so as to be warped to a predetermined coordinate system is updated.

4. The method of claim 1, wherein the updating of the predetermined look-up table according to the determination can alternatively include:
    calculating a homography by using feature point matching when the parallax problems has occurred; and
    updating a look-up table of the overlapping area where the parallax problems has occurred by using the calculated result.

5. The method of claim 1, wherein the generating of the stitched image includes:
    performing warping for the input images to a predetermined coordinate system by applying the updated look-up table; and
    generating the stitched image by stitching the respective overlapping areas of the input images that are warped to the predetermined coordinate system.

6. The method of claim 1, wherein the updating of the predetermined look-up table according to the determination includes:
    dividing the overlapping area into a plurality of sub-areas when the parallax problems has occurred; and
    updating the look-up table of the overlapping area where the parallax problems has occurred based on a difference value between pixels included in the sub-area.

7. An apparatus for generating a stitched image used for panoramic images or 360-degree images, the apparatus comprising:
    an input unit configured to obtain a plurality of input images;
    a control unit; and
    a storage unit configured to store a predetermined look-up table, wherein
    the control unit configured to:
    determine whether or not a parallax problem occurs between overlapping areas of the obtained input images;
    update the look-up table according to the determination by adjusting a value of a control point on at least one overlapping adjacent region; and
    generate a stitched image by applying the updated look-up table to the input images,
    wherein the overlapping areas is a region where the plurality of input images overlapped, and the overlapping adjacent region is adjacent to the overlapping areas.

8. The apparatus of claim 7, wherein the control unit calculates a sum of squared errors (SSE) of each of the overlapping areas of the input images, and compares the calculated SSE with a predetermined threshold value.

9. The apparatus of claim 7, wherein in the updating of the look-up table, the value of the control point that is used as a reference point so as to be warped to a predetermined coordinate system is updated.

10. The apparatus of claim 7, wherein the control unit can alternatively calculate a homography by using feature point matching when the parallax problem has been occurred, and updates a look-up table of the overlapping area where the parallax problem has been occurred by using the calculated result.

11. The apparatus of claim 7, wherein the control unit performs warping for the input images to a predetermined coordinate system by applying the updated look-up table, and generates the stitched image by stitching the respective overlapping areas of the input images that are warped to the predetermined coordinate system.

12. The apparatus of claim 7, wherein the control unit divides the overlapping area into a plurality of sub-areas when the parallax problem has occurred, and updates a look-up table of the overlapping area where the parallax problem has occurred based on a difference value between pixels included in the sub-area.

13. The method of claim 1, wherein the adjustment of the value of the control point is performed by using a distance between the control point and the overlapping area where the parallax has occurred.

14. The apparatus of claim 7, wherein the adjustment of the value of the control point is performed by using a distance between the control point and the overlapping area where the parallax has occurred.

* * * * *